C. J. HARDING.
ACCOUNT DEPOSIT BOOK.
APPLICATION FILED NOV. 1, 1915.
1,294,657.
Patented Feb. 18, 1919.
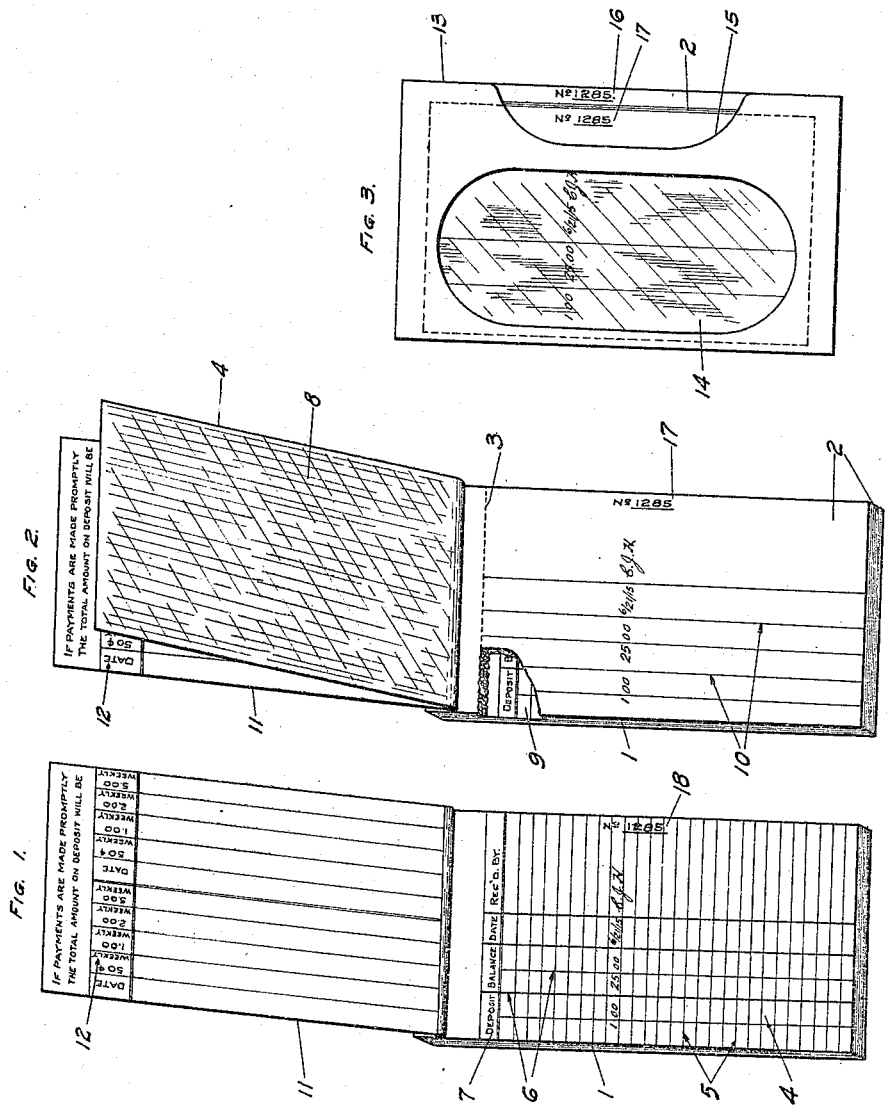
WITNESSES:
N. E. Blake
Lela M. Cole
INVENTOR
CLARK J. HARDING,
BY
ATTORNEY

UNITED STATES PATENT OFFICE.

CLARK J. HARDING, OF PITTSFIELD, MASSACHUSETTS.

ACCOUNT DEPOSIT-BOOK.

1,294,657.

Specification of Letters Patent.  Patented Feb. 18, 1919.

Application filed November 1, 1915. Serial No. 58,993.

*To all whom it may concern:*

Be it known that I, CLARK J. HARDING, a citizen of the United States, residing at Pittsfield, in the county of Berkshire and State of Massachusetts, have invented certain new and useful Improvements in Account Deposit-Books, and Methods of Deposit-Accounting, of which the following is a specification.

This invention relates to an improved form of deposit record and method of keeping accounts, and is particularly, although not exclusively, adapted for use in banking institutions and other money depositories.

The usual prevailing method employed in banks of keeping records of deposits of money made from time to time by customers involves the use of an individual pass-book, into which is entered by the bank a brief record of the amount and time of each deposit of money. This book is supplied by the bank to its customer, is issued in his name and is produced by the customer at the time of each deposit. A separate record of such deposits is also made at the time of deposit upon a deposit slip which is retained in the possession of the bank and used as a memorandum from which an additional record is made up in a permanent ledger.

One object of this invention is to simplify the method or process of book-keeping in banks and other money depositories with reference to deposit accounts, whether such accounts be of a special or ordinary character. A further object is to improve the construction, form and arrangement of deposit account books.

To these ends the invention consists in the method and forms hereinafter described and claimed.

Referring to the accompanying drawings, wherein is illustrated a preferred form of embodiment of my deposit account book and deposit slip retainer adapted for use in my improved method of accounting, Figure 1 is a perspective face view of the deposit book or pad in position for use, the cover being raised and exposing to view the reference table provided on the under side thereof, and also the deposit account sheet upon which original entries are made; Fig. 2, a similar view, showing the account sheet turned back and exposing to view the carbonized undersurface thereof, and showing also the first or top detachable copy leaf or deposit slip, a portion of the book in the upper left hand corner being cut away to disclose a separate carbonized account sheet interleaved with the deposit slips at a middle point of the book; and Fig. 3, a front elevation of the deposit slip retainer employed in connection with the deposit book and adapted to receive the deposit slips after detachment from the book.

As shown, I provide a pass-book in the form of a pad 1, comprising a plurality of leaves 2, 2, etc., which for purposes of convenience will be hereinafter designated as deposit slips, said deposit slips being of convenient form and size and secured together in any approved manner, and separately detachable from the body of the pad on a weakened or perforated line 3 provided at the top of each slip.

I further provide as an initial leaf and superimposed on the slips 2, 2, etc., an original entry sheet 4, hereinafter designated an account sheet, which is of the same form and size as the deposit slips 2, 2, etc., and likewise incorporated in and preferably detachable from the body of the pad 1. Said account sheet 4 is preferably provided on its face with parallel crosslines 5, 5, etc., on which are entered by the teller a record memoranda of deposits, a separate line being devoted to each deposit, such memoranda preferably to include the amount of the deposit, the balance of the account, the date of entry or deposit, and the name or initial of the receiving teller, arranged in orderly columnar formation and suitably divisioned by longitudinally arranged lines 6, 6, etc., the heads of each column being suitably captioned with appropriate indicating words arranged on a line 7. The underside 8 of the account sheet 4 is preferably carbonized to convey to the deposit slip immediately under the account sheet a true copy of the entry. And while I prefer to carbonize the underside of the account sheet for the purpose stated, it will be apparent that any other suitable means adapted to perform the same function may be employed, as for example a separate carbon paper.

Other like account sheet may be embodied in the pad 1 and interleaved with the deposit slips 2, 2, etc., at predetermined points, a sufficient number of such sheets being used to contain an aggregate number of entry lines equal to the number of deposit slips.

In the drawings (Fig. 2) I have shown one additional such sheet 9, which is inserted at a middle point of the pad.

The deposit slips 2, 2, etc., are preferably provided with longitudinally arranged parallel lines, 10, 10, etc., to division the surface into columns corresponding to the main columnar divisions of the account sheet and adapted to dispose the memoranda of the entry impressed thereon exactly as arranged on the account sheet.

The pad 1, as shown, is provided with a cover 11, which may be folded back to expose to view a reference table provided on the underside 12 and adapted to the character of the deposit account.

After the entry of any particular deposit on the account sheet 4, the deposit slip 2 underneath on which the impression of such entry has been recorded as above stated, is then detached from the pad 1 and placed by the teller in a retainer 13, which is herein shown to be provided with a transparent window 14 on its face side and adapted to expose to view the record on the last deposit slip within, which may thereafter be referred to and read without removal from its given position within the retainer and until other slips are placed in order above it. While I have shown the retainer 13 to be provided with a window 14, it will be apparent that the face or entire body of the retainer may be constructed of transparent material, in which case the provision of a window would be unnecessary.

The retainer 13 is unsealed the length of its right edge to provide a suitable opening for the admission and withdrawal of the deposit slips 2, 2, etc., without folding, the face of the retainer 13 being suitably cut away centrally on its right margin on the line 15 to provide a convenient thumb space for manipulating the deposit slips and also to expose to view the depositor's given number, which is provided, as at 16, on the exposed portion of the back of the retainer and conveniently arranged over the same numeral provided on each of the deposit slips, as at 17, for comparative reference, the account sheet being also preferably suitably numbered, as at 18.

I claim:—

1. In a deposit account book, the combination of an initial entry sheet ruled on its face for the orderly columnar entry of memoranda of a series of deposits and carbonized on its reverse side, and a plurality of separately detachable deposit-sheets arranged in superposed relation under said entry sheet for receiving successively a carbonized impression of the entry of one of a series of deposits on the entry sheet, and successively detached after the entry thereon has been received, said entry sheet and deposit-sheets being securely held together and severally bearing a common reference symbol.

2. A deposit account book comprising a plurality of sheets secured together in separately detachable relation, each sheet having a common indicating reference symbol and constituting a separate single-entry sheet, and an initial plural-entry sheet bearing said reference symbol and ruled on its face side to provide for the columnar arrangement of memoranda indicating the amount of deposit, the time of deposit and the validating mark of the receiving depository, said initial sheet being carbonized on its reverse side for simultaneously producing a duplicate copy of each deposit entry on a single-entry sheet of said book, the separate single-entry sheets to be detached from the book successively after the entry thereon has been received and retained by the banking depository and the remainder of said book to be kept in the custody of the depositing customer until the next deposit.

In testimony whereof I hereunto affix my signature in presence of two witnesses.

CLARK J. HARDING.

Witnesses:
JNO. J. WHITTLESEY,
MILTON B. WARNER.

Copies of this patent may be obtained for five cents each, by addressing the "Commissioner of Patents, Washington, D. C."